United States Patent Office 3,050,554
Patented Aug. 21, 1962

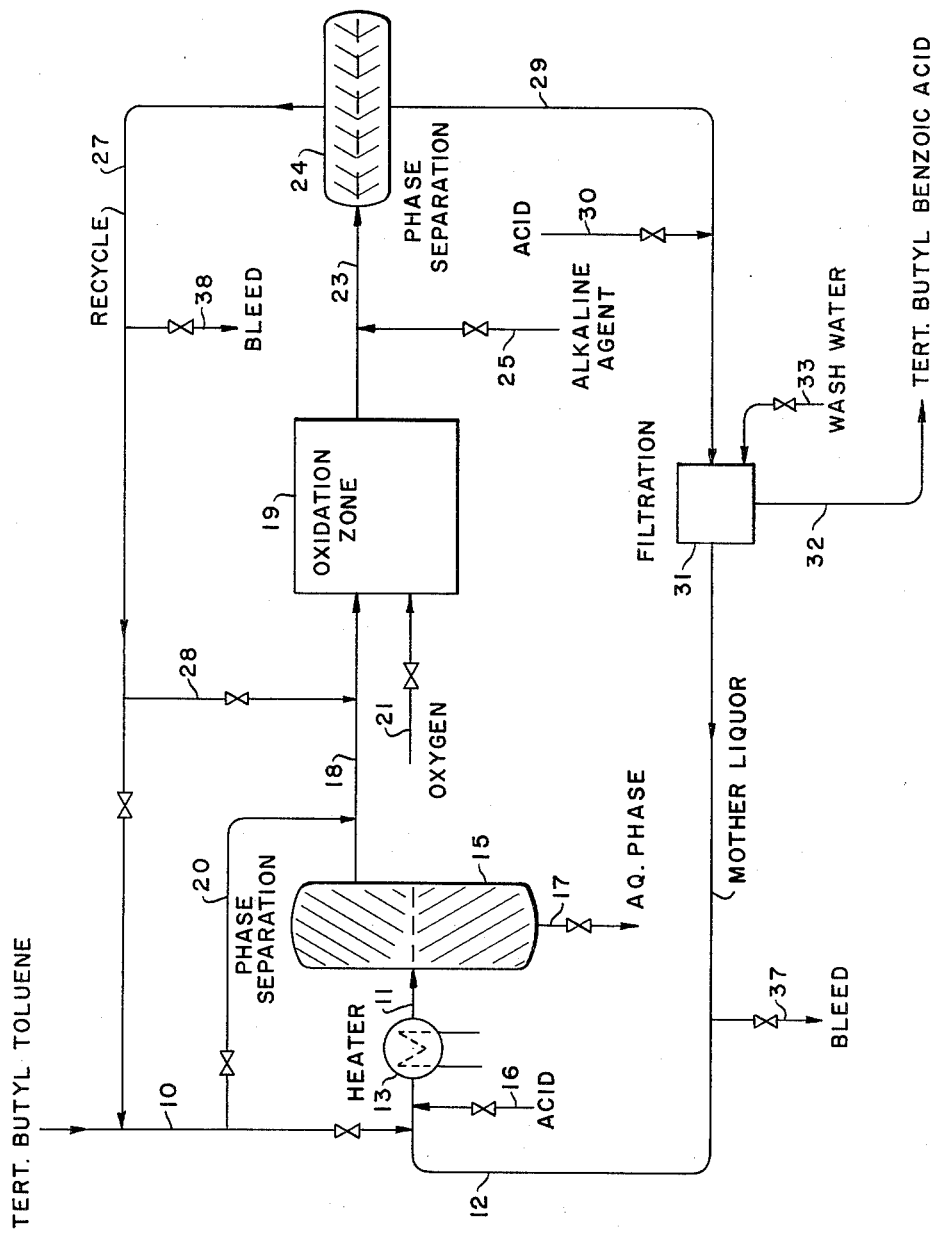

3,050,554
CATALYTIC OXIDATION OF TERTIARY BUTYL TOLUENE AND RECOVERY OF OXYGENATED PRODUCTS
Lee M. Porter, Pleasant Hill, Calif., William A. Chantry, Houston, Tex., and Roger F. York, Anaheim, Calif., assignors to Shell Oil Company, a corporation of Delaware
Filed July 7, 1958, Ser. No. 746,954
6 Claims. (Cl. 260—524)

This invention relates to an improved process for the production and recovery of aromatic acids. The invention relates more particularly to an integrated process for the production of aromatic acids comprising alkyl-substituted benzoic acids by molecular oxidation of alkyl-substituted benzenes, providing for substantially complete recovery of all valuable components within the system.

Aromatic acids, such as, for example, alkyl-substituted benzoic acids, are produced by catalytic oxidation of corresponding aromatic hydrocarbons with molecular oxygen. Para-tert. butyl benzoic acid is obtained by catalytic oxidation with molecular oxygen of tert. butyl toluene. The crude reaction mixtures obtained in such oxidations are generally exceedingly complex, containing a desired aromatic acid in admixture with isomeric forms of the acid, unconverted hydrocarbon charge, oxygen-containing by-products including valuable precursors of the aromatic acids, etc. Recovery of the desired aromatic acid from such a complex reaction mixture, in a high state of purity, and in a manner within the realm of practicability, has heretofore presented serious problems. A method of recovery resorted to consists of the caustic extraction of the reaction mixture followed by liberation of the desired aromatic acid from the caustic extract by acid addition. As generally practiced heretofore, however, the proportion of the desired aromatic acid which can actually be recovered is often below that commensurate with efficient practical-scale operation. The amounts of valuable organic materials unavoidably lost therein are often of themselves sufficiently great to detract materially from efficient operation of the process. In such recovery operations minimum product purity is not obtained when more than but a fraction of the available aromatic acid in the caustic extract is precipitated therefrom during the acid-springing step. The proportion of desired aromatic acid which can be safely sprung from the caustic extract and still obtain satisfactory product purity is often less than 70% of the aromatic acid available in the extract. The substantial amount of residual aromatic acid is generally lost by elimination with the aqueous mother liquor formed during the acid-springing step of the process.

Further disadvantages inherent in the method of recovery as practiced heretofore comprise the loss generally suffered therein of considerable quantities of valuable organic components such as unconverted aromatic hydrocarbon charge, oxygen-containing precursors of the desired aromatic acid, and the like. The salts of aromatic acid formed during the caustic extraction phase of the process exert a substantial solutizing effect upon the unconverted aromatic hydrocarbons present, with the result that a considerable part of these valuable hydrocarbons pass into the caustic extract and remain in the aqueous mother liquor of the process. Oxygen-containing compounds intermediate in the formation of the desired aromatic acid are also taken into the caustic extract and are carried through into the mother liquor produced in the aromatic acid liberation step. Recovery of these organic components from the mother liquor obtained in the recovery steps of the process entails the need for additional costly, and often exceedingly complex, operative procedures detracting still further from the efficiency of the process.

A still further distinct disadvantage of the process as practiced heretofore, resides in the inherent limitation with respect to permissible degree of freedom in operative procedures of the recovery steps involved. Since the amount of aromatic acid which is precipitated during the acid-springing step of the process may not exceed that amount at which simultaneous precipitation of impurities commences; and since economic feasibility of the process as practiced heretofore necessitates execution of the acid-springing step at maximum precipitation rate, even a slight variation in factors involved in any of the operative procedures of the process may at times result in the obtaining of a product of unsatisfactory quality.

It is therefore an object of the present invention to provide an improved integrated oxidation and recovery process enabling the more efficient production and recovery of aromatic acids wherein the above difficulties are obviated to at least a substantial degree.

Another object of the present invention is to provide an integrated oxidation and recovery process enabling the more efficient production and recovery of aromatic acids wherein aromatic hydrocarbons are subjected to catalytic oxidation with molecular oxygen and product acid is recovered by the method of caustic extraction and acid-springing, under conditions providing for substantially complete recovery within the system of all valuable organic components in aqueous mother liquor produced.

A further object of the invention is the provision of an improved process enabling the more efficient recovery of valuable components from reaction products produced in processes wherein aromatic hydrocarbons are subjected to catalytic oxidation with molecular oxygen.

A still further object of the invention is the provision of an improved process enabling the more efficient recovery of valuable components from aqueous mother liquors obtained in the separation of aromatic acids from aromatic hydrocarbon oxidation products by methods involving selective salt formation and acid springing.

Still another object of the invention is the provision of an improved process enabling the more efficient recovery of valuable components from reaction mixtures in processes wherein alkyl-substituted benzenes are oxidized to the corresponding aromatic acids. Other objects and advantages of the present invention will become apparent from the following detailed description thereof made with reference to the attached drawing showing schematically one form of apparatus suitable for carrying out the process of the invention.

It has now been found that in a process for the production of aromatic acids by catalytic oxidation with molecular oxygen of aromatic hydrocarbons wherein aromatic acid is recovered from the oxidation products by the method comprising selective salt formation of the aromatic acid followed by liberation of the aromatic acid by acid springing, substantial improvement in efficiency as determined by ultimate product recovery and yield is obtained by first contacting at least a portion of the aromatic hydrocarbon to be oxidized with mother liquor produced in said acid-springing step, and using the resulting organic phase as charge to said catalytic oxidation.

In accordance with the invention organic components containing aqueous mother liquor remaining after separating solids from the acidified extract resulting from extraction of a crude reaction mixture emanating from an aromatic hydrocarbon oxidizing zone with aqueous alkali, is contacted in the liquid phase with an aromatic hydrocarbon, thereby forming an extract phase containing said aromatic hydrocarbon in admixture with extracted organic components and an aqueous phase containing impurities, and said extract phase is used as the aromatic hydrocarbon charge to said oxidation zone.

Referring to the drawing, an alkyl-substituted benzene, for example, tert. butyl toluene, emanating from an outside source, is forced through line 10, into line 11. Within line 11 the tert. butyl toluene is admixed with a stream of aqueous mother liquor emanating from within the system through line 12, as described herein below. The aqueous mother liquor thus admixed with the tert. butyl toluene will comprise water, inorganic salts and valuable organic components. The valuable organic components will comprise, for example, tert. butyl toluene, aromatic acids such as tert. butyl benzoic acid, oxygen-containing by-products including precursors of tert. butyl benzoic acid, dibasic acids, etc. The admixture of tert. butyl toluene and aqueous mother liquor will pass through line 11, provided with heating means, for example, an indirect heat exchanger 13, into a phase separating zone. The phase separating zone may comprise any suitable type of apparatus such as, for example, a chamber 15, enabling formation and separation of liquid phases therein. Within chamber 15 the admixture charged thereto is allowed to stratify thereby forming an upper organic layer and a lower aqueous layer.

In a preferred method of carrying out the invention the hydrogen ion concentration of the stream entering chamber 15 is preferably adjusted to assure a pH in the range of from about 6.5 to about 4.5, and preferably from about 4.5 to about 5.5, in the mixture undergoing phase separation within chamber 15. Maintenance of the pH at about 5 is particularly preferred. Adjustment of the hydrogen ion concentration is obtained by the introduction of a suitable agent, for example, a mineral acid, into line 11 by means of valved line 16. A suitable mineral acid comprises sulfuric acid. Although sulfuric acid is preferred the invention is in no wise limited to the use of only this acid and other mineral acids such as, for example, hydrogen chloride, phosphoric acids, and the like, may be used to obtain the desired adjustment of the pH value of the stream flowing into chamber 15. When the addition of an alkaline agent is required to obtain the desired hydrogen ion concentration of the mixture within chamber 15, a suitable alkaline agent such as, for example, aqueous sodium hydroxide, sodium carbonate, sodium bicarbonate, ammonia or the like may be introduced into line 11 by suitable means not shown in the drawing. In general the stream flowing through line 11, requires the addition of acid for proper adjustment of the pH and addition of alkaline agent will rarely be necessary.

Contents of the chamber 15 are preferably maintained at a temperature above about 35° C., and preferably at a temperature of from about 50° to about 100° C. A temperature in the range of from about 60° to about 75° C. is particularly preferred. The ratio of tert. butyl toluene to aqueous mother liquor charged to chamber 15 may vary considerably within the scope of the invention. Ratios of tert. butyl toluene to aqueous mother liquor in the range of from about 1:1 to about 1:20 by volume are satisfactory. A ratio of tert. butyl toluene to aqueous mother liquor in the range of from about 1:2 to about 1:10 is generally preferred. Higher or lower ratios may, however, be used within the scope of the invention.

Within the chamber 15 phase separation will occur with the formation of an upper organic layer and a lower aqueous layer. The upper organic layer will contain in addition to tert. butyl toluene, organic components extracted from the aqueous mother liquor comprising, for example, tert. butyl benzoic acid, oxygen-containing by-products of the process including precursors of tert. butyl benzoic acid, and the like. The lower aqueous layer will generally consist of water containing hydrocarbon-insoluble constitutents and water-soluble impurities formed within the system. The aqueous phase will contain inorganic materials, as, for example, sodium sulfate, etc. In addition the water phase will contain, by control of temperature and pH as above defined, certain organic impurities, such as salts of dibasic acids and the like, formed within the system.

Maintenance of the desired temperature conditions within chamber 15 is obtained by the provision of heating means such as for example indirect heat exchanger 13 in line 11, and optionally by the provision of other conventional means not shown in the drawing for the introduction or removal of heat.

A mixing zone such as, for example, a chamber, tower, or the like, not shown in the drawing, may be positioned in line 11 between the exchanger 13 and chamber 15. Such a mixing zone may be provided with conventional means such as stirrer or the like to obtain agitation of the contents therein.

From chamber 15 the organic phase is passed through line 18 into a suitable oxidizing zone, depicted diagrammatically in the drawing by box 19. A valved by-pass line 20 is provided for the introduction of a part of the tert. butyl toluene entering through line 10 directly into the oxidizing zone. Passage of part of the tert. butyl toluene from line 10, through line 20, allows the desired ratio of tert. butyl toluene to aqueous mother liquor to be maintained within chamber 15. The oxidizing zone may comprise one or more conventional reaction vessels of enlarged cross-sectional area such as a reaction chamber, and/or vessels of restricted cross-sectional area such as, for example, a tubular reactor or coil. Oxygen is introduced into the oxidizing zone 19 from an outside source by means of valved line 21. The oxygen need not necessarily be pure and may comprise an oxygen-containing gas such as air. Within the reaction zone the tert. butyl toluene-containing organic charge is subjected to suitable oxidizing conditions in the presence of an oxidation catalyst such as, for example, cobalt octoate. Conditions of temperature and pressure employed are those of the prior art effecting the reaction of tert. butyl toluene with oxygen with the formation of reaction products comprising tert. butyl benzoic acid. Suitable conditions comprise for example a temperature of from about 125° to about 200° C. and preferably from about 150° to about 170° C. The reaction mixture is preferably maintained at a pressure sufficiently high to assure the maintenance of at least a substantial part of the organic charge thereto and the aromatic hydrocarbon oxidation products in the liquid phase during the oxidation.

Under the above-defined conditions tert. butyl toluene is oxidized to reaction products comprising tert. butyl benzoic acid. In addition to the tert. butyl benzoic acid the reaction mixture will comprise unconverted tert. butyl toluene, oxygen-containing by-products including precursors of tert. butyl benzoic acid, a minor amount of dibasic acids, etc. Oxygen-containing by-products in the reaction mixture will also include lesser amounts of such materials as lower-boiling aliphatic acids, such as acetic acid; lower-boiling alcohols and aldehydes; higher-boiling aromatic compounds comprising esters and traces of phenolic compounds; etc.

The complex reaction mixture is passed from the oxidizing zone 19 to suitable means for the recovery of desired tert. butyl benzoic acid therefrom. Suitable recovery means comprises caustic extraction followed by liberation of aromatic acid by acid springing. To this effect effluence from reaction zone 19 is passed through line 23 into a phase separating zone comprising a chamber 24. An alkaline agent capable of reacting with the tert. butyl benzoic acid with the formation of reaction products comprising a salt of tert. butyl benzoic acid with the alkaline agent is introduced into line 23 from an outside source, by means of valved line 25. Suitable alkaline agents comprise the hydroxides and carbonates of the alkali metals, such as, for example, sodium hydroxide, potassium hydroxide, sodium carbonate, sodium bicarbonate, lithium hydroxide, ammonium hydroxide and the like. Aqueous solutions of the alkaline agent, for example, aqueous sodium hydroxide, having concentration of from about 3 to about 10%, and preferably from about 5 to about 10%, have been found suitable. The alkaline agent is added in amount sufficient to react with at least a substantial amount of the tert. butyl benzoic acids present in the reaction mixture. The addition of the alkaline agent in substantial stoichiometric excess is, however, avoided.

Within chamber 24 the reaction mixture with added alkaline agent will separate into an upper organic phase consisting predominantly of tert. butyl toluene and a lower aqueous phase. The lower aqueous phase will comprise the salt of tert. butyl benzoic acid with the alkaline agent, which when using sodium hydroxide as the alkaline agent will consist of the sodium salt of tert. butyl benzoic acid. In addition, the aqueous phase will contain salts of aliphatic acids such as acetic, propionic, etc. as well as salts of dicarboxylic acids. The aqueous phase will furthermore contain substantial amounts of tert. butyl toluene as a consequence of the solutizing effect of the organic sodium salts, and oxygen-containing by-products including precursors of tert. butyl benzoic acid, etc.

The organic phase is passed from chamber 24, through valved lines 27 and 28 to the oxidizing zone. A part or all of the tert. butyl toluene emanating from chamber 24 may be passed directly from line 27 into line 10, and thus pass into line 11 to admix with the aqueous mother liquor.

The aqueous phase is taken from chamber 24 through line 29. Sufficient mineral acid emanating from an outside source through valved line 30 is added to the stream passing through line 29 to liberate tert. butyl benzoic acid from its salt. Suitable mineral acids comprise, for example, sulfuric acid, hydrochloric acid, phosphoric acid, and the like. The use of sulfuric acid is generally preferred. The acid is preferably added in amount resulting in a hydrogen ion concentration of the resulting mixture below about 7, but not substantially below about 6. The greater part of the liberated tert. butyl benzoic acid will, under these conditions, be insoluble in the liquid medium in which it is formed. The stream containing the suspended tert. butyl benzoic acid is passed to suitable separating means. A suitable separating means comprises, for example, a centrifuge or other filtering device, represented in the drawing by filter 31. Within filter 31 tert. butyl benzoic acid is filtered out and eliminated as a final product from the system by suitable means, shown in the drawing by line 32. The precipitated tert. butyl benzoic acid product may be washed with a suitable solvent, for example, water. A valved line 33 is provided for the introduction of such wash water into the system.

One or all of the steps of caustic extraction, acid springing and filtering may be carried out at temperatures above normal with the aid of heating means not shown in the drawing.

The aqueous filtrate, or mother liquor, toegther with any wash water or other solvent employed, is passed from filter 31 through line 12, into line 11 wherein it is admixed with tert. butyl toluene emanating through valved line 10 as described herein above.

Valved lines 37 and 38 are provided for the withdrawal of a bleed from the system at these points should this be desired.

The amount of acid introduced into the system through valved line 30 will depend to some extent upon the purity of the product desired and specific operating conditions employed. When producing, as is generally desired, a product of high purity the amount of acid so introduced is controlled to effect the precipitation of aromatic acid at no greater rate than that assuring the obtaining of a product of uniformly high purity. Since, in general, the purity of the acid, as evidenced by the appearance of color-forming bodies, begins to decline when an amount greater than about 70% of available aromatic acid in the caustic extract flowing through line 29 is precipitated, the acid introduction is controlled to maintain the aromatic acid precipitation well below this amount. A particular advantage of the process of the invention resides in the fact that acid thus left in the stream will not be lost but will be cycled through the system unchanged. The process of the invention thus enables the maintaining of a comfortable margin of safety in the precipitation recovery without sacrifice of ultimate yield and enables the continuous production of the desired aromatic acid with uniformly high purity.

The aqueous filtrate, or mother liquor, leaving filter 31 through line 12, will not only contain the proportion of tert. butyl benzoic acid in the form of the salt which was not removed by precipitation before entering filter 31, but will contain additional amounts of valuable organic components. As a result of the solutizing action of the salt of the aromatic acid present, an appreciable amount of tert. butyl benzoic acid will be present in the aqueous mother liquor. In addition the mother liquor will contain substantial amounts of tert. butyl toluene, and the organic oxygen-containing by-products including tert. butyl benzoic acid precursors, lower aliphatic acids, dibasic acids, and the like. As described herein all the valuable organic components of the aqueous mother liquor are extracted by the tert. butyl toluene feed to the system and will appear in the organic phase separated in chamber 15.

Inorganic salts such as, for example, sodium sulfate, formed during the acid-springing operation and salts of dibasic acids, will remain in the aqueous phase of the mother liquor separated in chamber 15, and eliminated therefrom through valve line 17.

The following example is illustrative of the efficiency with which the valuable organic components are continuously recovered from the aqueous mother liquor within the system by extraction with the tert. butyl toluene feed to the oxidation.

EXAMPLE I

In an operation "A," a crude oxidation reaction mixture, obtained by oxidizing tert. butyl toluene with molecular oxygen, at 150° C. and 100 lbs. pressure, in the presence of a cobalt catalyst, consisting predominantly of unconverted tert. butyl toluene, tert. butyl benzoic acid, dibasic acids, and oxygen-containing by-products including tert. butyl benzoic acid precursors, was extracted with 7.5% aq. sodium hydroxide. The resulting caustic extract was acidified with an amount of concentrated sulfuric acid sufficient to convert 60% of the sodium tert. butyl benzoate to free tert. butyl benzoic acid which precipitated as a solid phase consisting essentially of white crystals of pure tert. butyl benzoic acid. The solid phase was separated from the mother liquor by filtration. To the remaining aqueous mother liquor, having essentially the composition indicated in the column headed "Feed" of the following Table A, there was added tert. butyl toluene as extractant in a volume ratio of aqueous tert. butyl toluene extractant to mother liquor of 1:3.5. The pH of the resulting mixture was adjusted by the addition of concentrated sulfuric acid to a pH of 5. The resulting organic and aqueous phases were separated by stratification at 65° C. Phase separation was complete in 50 seconds. The composition of the resulting aqueous and organic phases was found to be as indicated in the columns headed "Product" in the following Table A.

Table A

| | Feed, mother liquor, percent weight | Product Aqueous phase, percent weight | Product Organic phase, percent weight | Recovery, percent |
|---|---|---|---|---|
| Free tert. butyl benzoic acid | 2.1 | 0 | 23.2 | |
| Na salt of tert. butyl benzoic acid (as the acid) | 6.0 | 0.6 | | |
| Total tert. butyl benzoic acid | 8.1 | 0.6 | 23.2 | 92 |
| Dibasic acids | 1.7 | 1.8 | 0 | |
| Neutral organics including tert. butyl toluene | 1.9 | 0 | 5.9 | 100 |
| Added tert. butyl toluene (extractant) | | | 70.9 | |
| Total organics | 11.7 | 2.4 | 100.0 | |
| $H_2O + Na_2SO_4$ | 88.3 | 97.6 | 0.2 | |

The organic charge, comprising recovered organic constituents recovered from the aqueous mother liquor is oxidized efficiently to reaction mixtures comprising the desired aromatic acid within the oxidizing zone 19. Substantially higher ultimate yields of the desired aromatic acids are obtained in the process of the invention. Such increase in yield is directly attributable to the presence in the feed to the oxidation zone 19 of recovered organic components extracted by the tert. butyl toluene feed from the aqueous mother liquor produced within the system.

The efficiency with which the organic charge containing recovered organic components extracted from the aqueous mother liquor is converted in the oxidizing step of the process is evidenced by the following example:

EXAMPLE II

In a separate operation "B" the foregoing operation "A" was repeated with the exception that the mother liquor included the wash water (obtained by washing the solid phase precipitated from the caustic extract) and in that the volume ratio of tert. butyl toluene extractant to mother liquor was 1:7.2. Results obtained are set forth in the following Table B.

Table B

| | Feed, mother liquor, percent weight | Product Aqueous phase, percent weight | Product Organic phase, percent weight | Recovery, percent |
|---|---|---|---|---|
| Free tert. butyl benzoic acid | 1.1 | 0.4 | 25.7 | |
| Na salt of tert. butyl benzoic acid (as the acid) | 3.9 | | | |
| Total tert. butyl benzoic acid | 5.0 | 0.4 | 25.7 | 88 |
| Dibasic acids | 1.0 | 1.1 | | |
| Neutral organics including tert. butyl toluene | 0.9 | 0 | 5.4 | 100 |
| Added tert. butyl toluene (extractant) | | | 68.9 | |
| Total organics | 6.9 | 1.5 | 100.0 | |
| $H_2O + Na_2SO_4$ | 93.1 | 98.5 | | |

EXAMPLE III

In a continuous operation "C," the tert. butyl toluene-containing organic extract phase, produced within the system as described below, is introduced as charge to an oxidation reactor wherein it is reacted with molecular oxygen, introduced as air, at 150° C., and a pressure of 100 lbs., in the presence of a cobalt catalyst. The reactor effluence is extracted with aqueous 7% NaOH, thereby forming an organic phase consisting essentially of tert. butyl toluene and an aqueous caustic extract phase. The organic phase is recycled to the reactor. Concentrated sulfuric acid is added to the caustic extract phase thereby forming a solid precipitate of pure tert. butyl benzoic acid. The sulfuric acid is added in an amount precipitating about 60% of the tert. butyl benzoic acid in the caustic extract. The precipitate is separated from the mother liquor by filtration leaving aqueous mother liquor containing in addition to water and sodium sulfate, tert. butyl toluene, tert. butyl benzoic acid, sodium salt of tert. butyl benzoic acid, intermediate oxidation products including tert. butyl benzoic acid precursors. The pH of the mother liquor is adjusted to a pH of 5 by adding sulfuric acid. To the resulting acidified mother liquor there is added tert. butyl toluene from an outside source in a volume ratio of tert. butyl toluene to mother liquor of about 1:7 and the resulting admixture is allowed to stratify at 65° C. for about one minute, thereby forming an organic extract phase and an aqueous phase. There is extracted from the mother liquor by the tert. butyl toluene extractant 82.2% of the tert. butyl toluene, 75.4% of the tert. butyl toluic acid was 73.2% of the intermediate oxidation products including precursors of tert. butyl benzoic acid, contained therein. No detectable amount of dibasic acids is found in the organic extract phase during the operation. Organic extract phase so obtained by extracting the mother liquor with tert. butyl toluene is used as said tert. butyl toluene-containing organic charge to said oxidation reactor.

In a separate and distinct operation "D" the operation "C" was repeated under substantially identical conditions but with the exception that the aqueous mother liquor was discarded and the tert. butyl toluene used as extractant in operation "C" was sent directly to the oxidation zone as the tert. butyl toluene-containing charge. Results obtained in each of the operations "C" and "D" are shown in the following Table C.

Table C

| | Operation "C" | Operation "D" |
|---|---|---|
| Tert. butyl benzoic acid yield in oxidation reactor percent (mole tert. butyl benzoic acid/100 mole tert. butyl toluene) | 81.1 | 69.3 |
| Pounds of tert. butyl toluene charged per pound of tert. butyl toluic acid produced | 1.27 | 2.1 |

EXAMPLE IV

For the purpose of comparison the operation "D" was repeated in an operation "E" under substantially identical conditions but with the exception that in the acid-springing step sulfuric acid was added to the caustic extract in an amount precipitating 75.1% of the tert. butyl benzoic acid therein instead of 60%. In the operation "E" 1.6 lbs. of tert. butyl toluene charge were required to produce 1 lb. of tert. butyl benzoic acid. This is an increase of over 25% of the amount of tert. butyl toluene required in the operation "C," executed in accordance with the invention wherein the aqueous mother liquor is extracted with tert. butyl toluene charge to the system.

Although the process of the invention has been described in detail in its application to the production of tert. butyl benzoic acid from tert. butyl toluene, it is to be understood that the invention is in no wise limited to the production of only this specific aromatic acid. The invention may be applied broadly to the production in accordance with the invention of aromatic acids from corresponding aromatic hydrocarbons containing an alkyl-substituted aromatic nucleus. Examples of suitable aromatic hydrocarbons converted in accordance with the invention comprise, for example, the alkyl-substituted benzenes and the alkyl-substituted naphthalenes, such as toluene, xylenes, ethylbenzene, propylbenzene, isopropylbenzene, tetramethylbenzene, para-cymene, 1-methyl-4-tert. butylbenzene, 1-methyl-4-tert. amylbenzene, methyldodecylbenzene, methylnaphthalene, dimethylnaphthalene and their homologues.

A preferred class of aromatic hydrocarbons oxidized in accordance with the invention comprises the alkyl-substituted benzenes having at least one tert. alkyl radical and at least one non-tert. alkyl radical linked directly to the benzene ring. Aromatic hydrocarbons comprised in the preferred class of tert. alkyl-substituted benzenes are, for example, the tert. alkyl-substituted toluenes, such as the tert. butyl toluenes, the tert. amyl toluenes, tert. hexyl toluenes, tert. heptyl toluenes, tert. nonyl toluenes, tert. dodecyl toluenes, di-tert. butyl toluenes, etc. While the tert. alkyl-substituted toluenes form a particularly preferred class of aromatic hydrocarbons suitable as charge to the process of the invention there can also be employed aromatic hydrocarbons having substituted on the benzene ring a tert. alkyl group and in addition thereto, a plurality of methyl groups and/or one or more lower alkyl groups other than the methyl group. Such aromatic hydrocarbons are illustrated by the tert. butyl xylenes, the tert. heptyl xylenes, the tert. dodecyl xylenes, ortho-tert. hexyl-ethylbenzene, 2-propyl-4-tert. butyl ethylbenzene, etc.

The invention is not limited to the use of a specific catalyst or specific oxidizing conditions within oxidizing zone 19 of the process. No claim is laid herein to the oxidation of aromatic hydrocarbons broadly, oxidizing conditions shown in the prior art to be capable of oxidizing alkyl-substituted aromatic hydrocarbons to corresponding aromatic acids having a carboxyl group in the alkyl side chain may be employed within oxidizing zone 19 of the process. Oxidation catalysts which may be employed in the oxidation stage of the process comprise, for example, oxides, hydroxides, bromides, and organic salts of the so-called heavy metals, particularly such metals as cobalt, manganese, tellurium, vanadium, chromium, cerium, mixtures thereof, etc. Included in suitable oxidation catalysts are organic salts of the metals of the first transition series of the elements, that is, those having an atomic number of from 22 to 30, and mixtures thereof. Examples of oxidation catalysts consisting essentially of a salt of a metal and an organic acid include, cobalt naphthenate, cobalt isovaleryl acetonate, chromium acetylacetonate, cobalt acetate, chromium naphthenate, cobalt para-toluate, and the like. Specific oxidation catalysts preferably employed will depend to some extent upon the specific hydrocarbon charge being oxidized and the specific operating conditions employed. Suitable oxidizing conditions which may be employed in the zone 19, particularly when oxidizing tert. alkyl-substituted benzenes comprise those disclosed in U.S. Patent 2,578,654.

We claim as our invention:

1. In a process for the production of tert. butyl benzoic acid wherein a tert. butyl toluene-containing charge is subjected in the liquid phase to an oxygen-containing gas in the presence of an organic salt of a heavy metal as oxidation catalyst at a temperature of from about 125° to about 200° C. and at a pressure sufficiently high to assure the maintenance of at least a substantial part of tert. butyl toluene-containing charge and oxidation products in the liquid phase during the oxidation, an aqueous alkaline agent capable of salt formation is added in amount sufficient to react with at least a substantial amount of tert. butyl benzoic acid present in the oxidation mixture, thereby forming an aqueous alkaline extract containing a salt of tert. butyl benzoic acid with said alkaline agent in admixture with entrained organic oxidation products and unconverted tert. butyl benzene, mineral acid is added to said aqueous alkaline extract, thereby precipitating a solid phase comprising free tert. butyl benzoic acid, and said solid phase is separated from the resulting mother liquor containing said entrained oxidation products and unconverted tert. butyl toluene, the improvement of adding said mineral acid to said aqueous alkali extract in an amount which is sufficient to precipitate no more than about 70% of the available tert. butyl benzoic acid in said aqueous alkali extract, adjusting the hydrogen ion concentration of said mother liquor to a pH of from about 4.5 to about 6.5, thereafter extracting said aqueous mother liquor with tert. butyl toluene in a ratio of tert. butyl toluene to aqueous mother liquor in the range of from about 1:1 to about 1:20 by volume and at a temperature of from about 35° to about 100° C., thereby forming an organic extract comprising said tert. butyl toluene in admixture with said entrained oxidation products consisting predominantly of tert. butyl benzoic acid, dibasic acids, oxygen-containing by-products including tert. butyl benzoic acid precursors and unconverted tert. butyl toluene, and employing said organic extract as said tert. butyl toluene-containing charge subjected to said oxidation.

2. The improvement in accordance with claim 1 wherein said mineral acid is added to said aqueous alkali extract in an amount which is sufficient to precipitate no more than about 60% of the available tert. butyl benzoic acid in said aqueous alkali extract.

3. The improvement in accordance with claim 1 wherein the hydrogen ion concentration of said aqueous mother liquor is adjusted to a pH of from about 4.5 to about 5.5 before said extraction with tert. butyl toluene.

4. The process in accordance with claim 1 wherein the extraction of said aqueous mother liquor with tert. butyl toluene is conducted at a temperature of from about 50° to about 75° C.

5. The improvement in accordance with claim 1 wherein the ratio of tert. butyl toluene extractant to aqueous mother liquor is in the range of from about 1:2 to about 1:10 by volume.

6. In a process for the production of tert. butyl benzoic acid wherein a tert. butyl toluene-containing charge is subjected in the liquid phase to molecular oxygen in the presence of an organic salt of cobalt as oxidation catalyst at a temperature of from about 150° to about 170° C. and at a pressure sufficiently high to assure the maintenance of at least a substantial part of tert. butyl toluene-containing charge and oxidation products in the liquid phase during the oxidation, an aqueous alkali metal alkaline agent having a concentration of from about 3% to about 10% and capable of salt formation is added in amount sufficient to react with at least a substantial amount of tert. butyl benzoic acid present in the oxidation mixture, thereby forming an aqueous alkali extract containing an alkali metal salt of tert. butyl benzoic acid with said alkali agent in admixture with entrained organic oxidation products and unconverted tert. butyl toluene, mineral acid is added to said aqueous alkali extract, thereby precipitating a solid phase comprising free tert. butyl benzoic acid, and said solid phase is separated from the resulting mother liquor containing said entrained oxidation products and unconverted tert. butyl toluene, the improvement of adding said mineral acid to said aqueous alkaline extract in an amount which is sufficient to precipitate no more than 60% of the available tert. butyl benzoic acid in said aqueous alkaline extract, adjusting the hydrogen ion concentration of said mother liquor to a pH of about 5, thereafter extracting said aqueous mother liquor with tert. butyl toluene in a ratio of tert. butyl toluene to aqueous mother liquor in the range of from about 1:3.5 to about 1:7.2 by volume and at a temperature of about 65° C., thereby forming an organic extract comprising said tert. butyl toluene in admixture with said entrained oxidation products consisting predominantly of tert. butyl benzoic acid, dibasic acids, oxygen-containing by-products including tert. butyl benzoic acid precursors and unconverted tert. butyl toluene, and employing said organic extract as said tert. butyl toluene-containing charge subjected to said oxidation.

References Cited in the file of this patent

UNITED STATES PATENTS

| | | |
|---|---|---|
| 2,578,654 | Hearne et al. | Dec. 18, 1951 |
| 2,906,775 | Taplin et al. | Sept. 29, 1959 |

FOREIGN PATENTS

| | | |
|---|---|---|
| 757,455 | Great Britain | Sept. 19, 1956 |